United States Patent [19]

Tateno

[11] Patent Number: 5,533,442
[45] Date of Patent: Jul. 9, 1996

[54] AVOCADO PEELER AND SLICER

[76] Inventor: Chikara R. Tateno, 1815 Katrina Ct., Santa Cruz, Calif. 95062

[21] Appl. No.: 561,106

[22] Filed: Nov. 21, 1995

[51] Int. Cl.⁶ ............................ A23N 3/00; A47J 17/00; A47J 25/00
[52] U.S. Cl. ................... 99/541; 99/540; 99/545; 30/114; 30/117; 30/123.5; 30/302; 83/437; 83/857; D7/673
[58] Field of Search ............................ 99/537–545, 584, 99/588; 30/113.1–113.3, 114, 117, 123.5–123.7, 128, 130, 300–304; 83/857, 437, 856, 858; D7/673

[56] References Cited

U.S. PATENT DOCUMENTS

| D. 149,622 | 5/1948 | Dougherty | D7/673 |
|---|---|---|---|
| 921,917 | 5/1909 | Troxell | 99/545 X |
| 1,466,114 | 8/1923 | Buchi | 30/302 |
| 1,607,009 | 11/1926 | March | 30/114 |
| 2,403,190 | 7/1946 | Parraga | 30/117 X |
| 2,509,190 | 5/1950 | Langley | 99/545 |
| 2,912,757 | 11/1959 | Knight | 99/495 X |
| 3,540,503 | 11/1970 | McNair | 99/544 X |
| 4,007,676 | 2/1977 | Ellis | 99/545 |
| 4,111,112 | 9/1978 | Altman | 99/545 X |
| 4,246,700 | 1/1981 | Coulon et al. | 99/544 X |
| 5,101,718 | 4/1992 | Lin | 99/537 X |
| 5,146,681 | 9/1992 | Haghkar | 99/589 X |

*Primary Examiner*—Timothy F. Simone
*Attorney, Agent, or Firm*—Jeffrey A. Hall

[57] ABSTRACT

A tool for use on an avocado, for separating the meat of an avocado from its skin while simultaneously cutting the meat into separate slices, comprising a handle having a first end and a second end and cutting rings are mounted at one end of the handle. The cutting rings including a pair of ring element operably secured to the handle and extending away therefrom. The pair of ring elements comprise an inner ring and outer ring formed from a continuous band. The inner ring has an elongated guide slot operably positioned therein, and the outer ring has an elongated guide slot operably positioned therein and in operably alignment with the elongated guide slot of the inner ring and extending therethrough. The inner ring includes a set element having a centrally positioned aperture therethrough and adapted for releasably securing and receiving the second end of the handle. A plurality of cutting blades are operably positioned on an inner wall of the inner ring and a plurality of cutting blades operably positioned on an inner wall of the outer ring. A fastening element is slidably secured to the inner ring and the outer ring allowing for adjustments of the outer ring and the inner ring in relation to each other and to the second end of the handle.

11 Claims, 2 Drawing Sheets

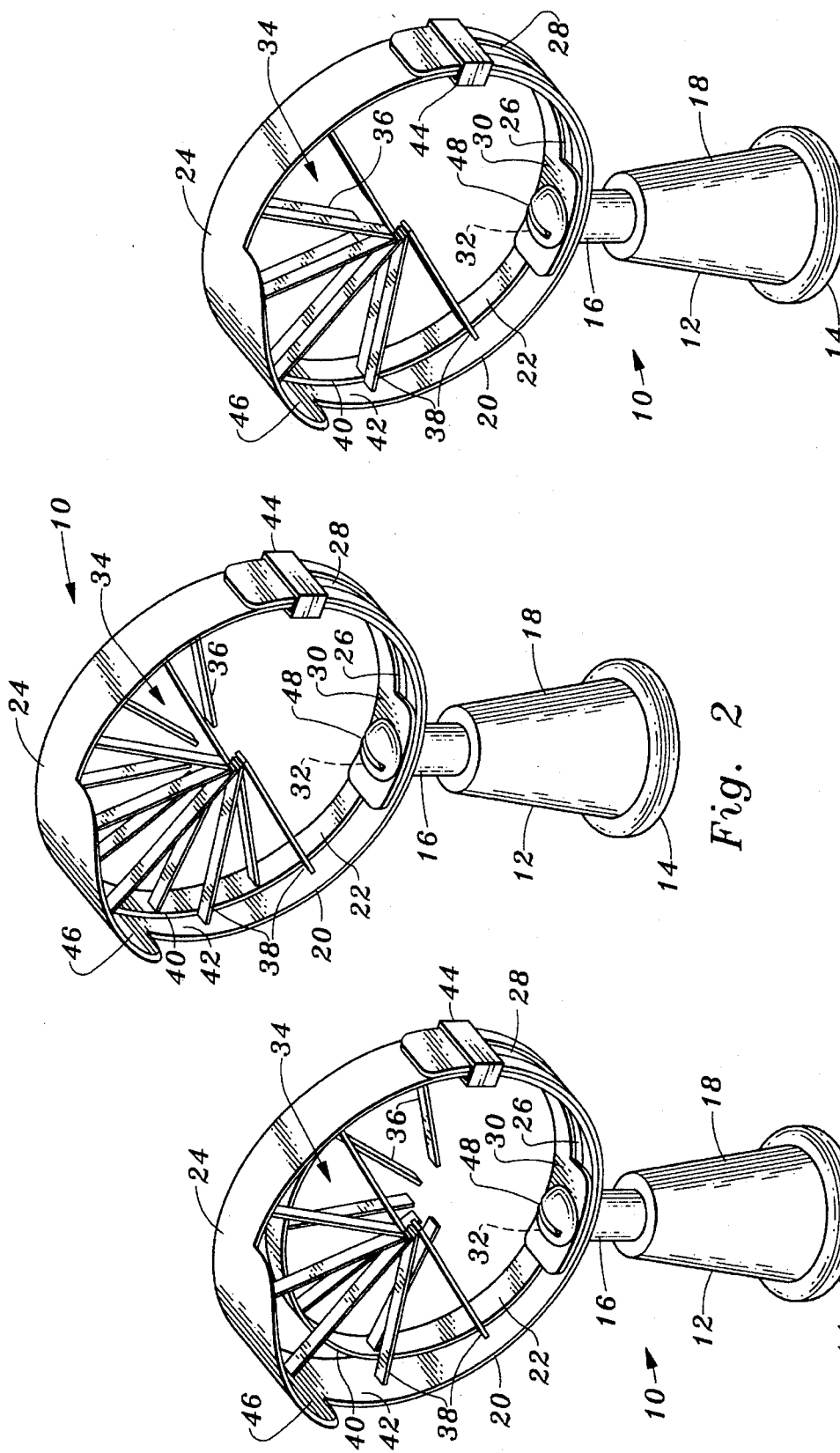

AVOCADO PEELER AND SLICER

BACKGROUND OF THE INVENTION

1. Field of Invention

This invention relates to cutlery, and more particularly to cutlery for peeling the skin of an avocado from its meat and simultaneously slicing the meat into sections.

2. Description of the Related Art

Various cutting and peeling and apparatus have been proposed and implemented to cut and peel fruits and vegetables. In recent years there has been a tremendous surge in the consumption of avocados both in restaurants and in homes. This surge in consumption is part in due to the surge in consumption of all fruits and vegetables, and part in due to the inherent qualities of the avocado.

The currently known method of preparing avocados has been labor intensive and messy, resulting in greater expense and inconvenience to the ultimate consumer. When large number of avocados must be skinned, de-pitted, and sliced whether in a restaurant or at home, significant expenditures of time and labor must be expended, both in the skinning, de-pitting, and slicing operation. Moreover, currently known methods for preparing avocado typically result in significant mess from discarded peels, pit, and residual meat. Due to such demand and such limitations with all known methods of preparing avocados, there is a significant demand for a tool which would enable avocados to be skinned, de-pitted, and sliced simultaneously in a rapid, clean, safe, and reliable manner.

Accordingly, it is the primary object of this invention to provide an avocado peeler and slicer which allows for the rapid, convenient, safe, and clean, peeling and slicing of avocados, and which is inexpensive to clean, use, and manufacture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purpose of the invention as embodied and broadly described herein, a tool for use on an avocado is provided, for separating the meat of an avocado from its skin while simultaneously cutting the meat into separate slices, comprises a handle having a first end and a second end, and cutting rings mounted at one end of the handle. The cutting rings include a pair of ring element operably secured to the handle and extending away therefrom. The pair of ring elements comprise an inner ring and outer ring formed from a continuous band. The inner ring has an elongated guide slot operably positioned therein, and the outer ring has an elongated guide slot operably positioned therein and in operably alignment with the elongated guide slot of the inner ring and extending therethrough. The inner ring includes a set element having a centrally positioned aperture therethrough and adapted for releasably securing and receiving the second end of the handle. A plurality of cutting blades are operably positioned on an inner wall of the inner ring and a plurality of cutting blades operably positioned on an inner wall of the outer ring. A fastening element is slidably secured to the inner ring and the outer ring allowing for adjustments of the outer ring and the inner ring in relation to each other and to the second end of the handle. The inner and outer ring may be provided as two rings formed from a single continuous band looped about itself, or formed from two separate rings and fastened together.

The avocado peeling and slicing tool may be provided in a variety of sizes to accommodate different sizes of avocados. The rings and cutting blades are preferably composed of metal, and the handle composed of plastic, rubber, composite, or other durable, resilient material. Preferably the cutting blades are positioned in a staggered relationship to one another on the inner surface of the inner ring and the inner surface of the outer ring and are provided in different lengths.

There is also provided in accordance with the invention an avocado peeling and slicing device, for separating the meat of an avocado from its skin while simultaneously cutting the meat into separate slices, comprising a handle having a first end and a second end and a ring element operably secured to the handle and extending away therefrom. The ring element has an elongated guide slot operably positioned therein and an overlapping extension element. The ring element includes a set element having a centrally positioned aperture therethrough adapted for releasably securing and receiving the second end of the handle therein. A plurality of cutting blades are operably positioned on an inner wall of the ring element. Fastening element means are provided and are slidably secured to the ring and the extension element allowing for adjustment and positioning of the ring and the extension element in relation to each other and to the second end of the handle.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1 is a front perspective view of an avocado peeler and slicer showing the inner ring and outer ring separated from one another, according to the invention.

FIG. 2 is a front perspective of an avocado peeler and slicer showing the inner ring and outer ring fastened together, according to the invention.

FIG. 3 is a front perspective of an avocado peeler and slicer having five cutting blades of equal length, according an embodiment of the invention.

DESCRIPTION OF THE PREFERRED EMBODIMENTS

Figure 4:
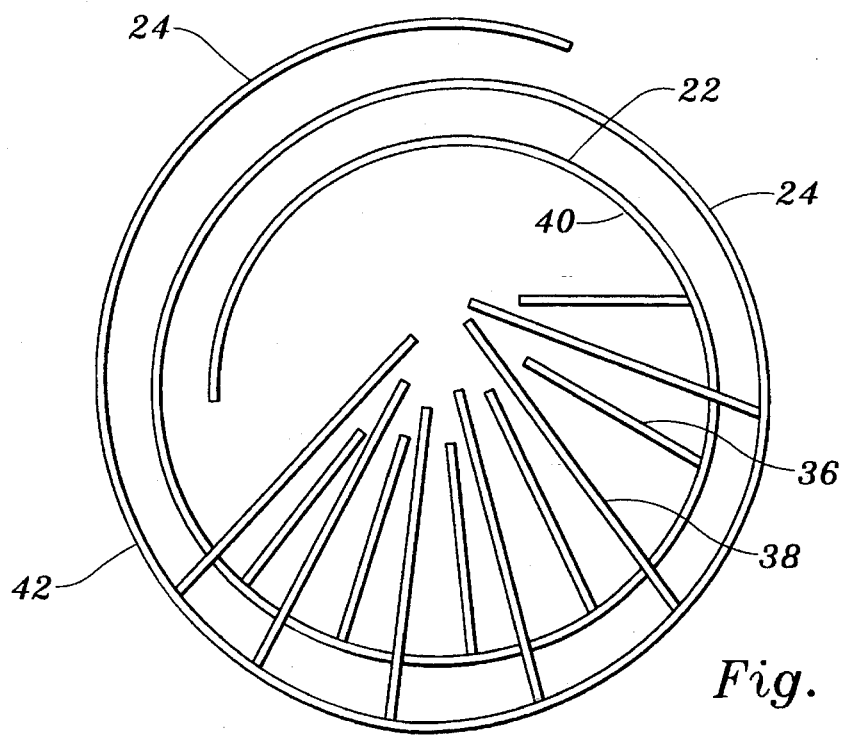
FIG. 4 is a schematic view of the ring and blade structure using a continuous one piece band to form the rings, according to the invention.

Reference will now be made in detail to the present preferred embodiments of the invention as illustrated in the accompanying drawings.

In accordance with the present invention, there is provided in a preferred embodiment of the invnetion a tool for use on an avocado, for separating the meat of the avocado from its skin while simultaneously cutting the meat into separate slices, comprising a handle having a first end and a second end. Cutting means are operably mounted at one end of the handle, the cutting means include a pair of ring elements operably secured to the handle and extending away therefrom. The pair of ring elements comprise an inner ring and outer ring formed from a continuous band. The inner ring has an elongated guide slot operably positioned therein, and the outer ring has an elongated guide slot operably positioned therein and in operably alignment with the elongated guide slot of the inner ring and extending therethrough. The inner ring preferably includes a set element having a centrally positioned aperture therethrough adapted for releasably securing and receiving the second end of the handle. A plurality of cutting blades are operably positioned on an inner wall of the inner ring and a plurality of cutting blades are operably positioned on an inner wall of the outer ring. A fastening element is preferably slidably secured to the inner ring and the outer ring allowing for adjustments of the outer ring and the inner ring in relation to each other and to the second end of the handle.

In accordance with another embodiment of the invention there is provided a single ring avocado peeler and slicer comprising a handle having a first end and a second end and a ring element operably secured to the handle and extending away therefrom. The ring element includes an extension element integral therewith. The ring element preferably includes an elongated guide slot operably positioned therein, and the extension element also has an elongated guide slot operably positioned therein and in operably alignment with the elongated guide slot of the ring element. The ring element includes a set element having a centrally positioned aperture therethrough adapted for releasably securing and receiving the second end of the handle therein. A plurality of cutting blades are operably positioned on an inner wall of the ring element. Fastening element means are slidably secured to the ring element and the extension element allowing for adjustment and positioning of the ring element and the extension element in relation to each other and to the second end of the handle.

In FIG. 1, the avocado peeling and slicing tool 10 is shown according to a preferred embodiment of the invention. Tool 10 has handle 12 having a first end 14, a middle portion 18, and an end portion 16 which may have a screw 48, bolt, or clip fastener operably secured thereto. Cutting means 20 are mounted at one end of handle 12, preferably at second end 16 and may be fastened thereto with screw 48. Cutting means 20 preferably comprise a pair of ring elements operably secured to handle 12 and extending away therefrom. The pair of ring element comprise an inner ring 22 and outer ring 24 formed from a continuous band. Inner ring has an elongated guide slot 26 operably positioned therein and the outer ring 24 has an elongated guide slot 28 positioned therein and in operable alignment with elongated guide slot 26 of inner ring 22 and extending therethrough. Inner ring 22 is preferably configured with a set element 30 comprising and broadened portion of inner ring 22 with a centrally positioned aperture 32 for receiving and securing second end 16 of handle 12 therein.

Although inner ring 22 and outer ring 24 have been described as two separate rings, tool 10 is preferably formed using a continuous band to form inner ring 22 and outer ring 24. In this configuration, outer ring 24 still encircles inner ring 22, and functions in exactly the same way, however, in this embodiment ring 22 and 24 are integral with one another forming a double ring from a continuous band as seen in FIG. 4. Rings 22 and 24 are preferably composed of a metal, such as stainless steel, however, other durable, resilient material may be used such as plastic.

Figure 5:
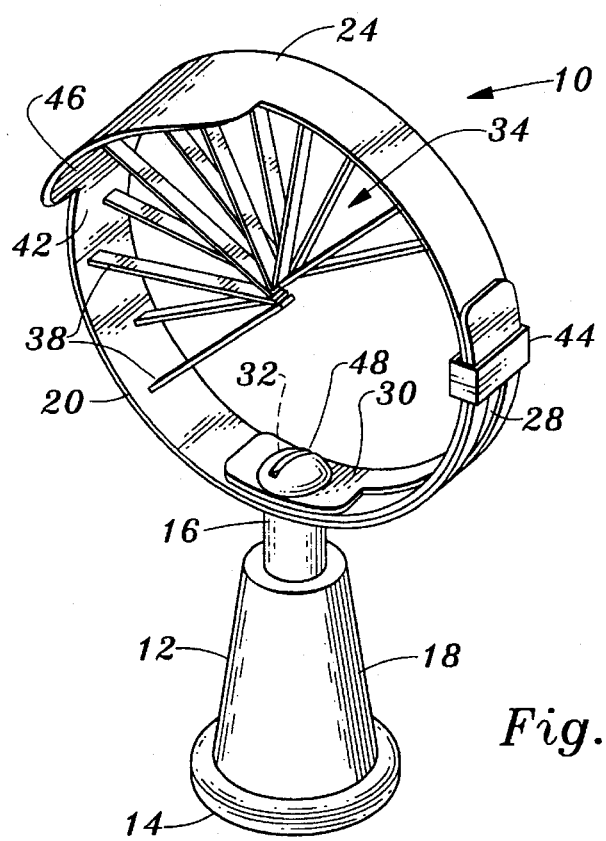
FIG. 5 is a front perspective of an avocado peeler and slicer having a single ring, according to an embodiment of the invention.

As seen in FIGS. 1, 4 and 5, a plurality of cutting blades 34 including short blades 36 and longer blades 38, are operably positioned on inner wall 40 of inner ring 22 and inner wall 42 of outer ring 24. Preferably either five blades or 11 blades are used. As seen in Pig. 1, inner ring 22 and outer ring 24 may be separated from one another to accommodate peeling and slicing different sizes of avocado. Tool 10 may be provided, in different embodiments, with cutting blades 34 being all of one size, for example all short blades, or all long blades, or provided, as previously described with a mix of short and long cutting blades. Cutting blades 34 are preferably composed of a metal, such as stainless steel, copper, alloys, or other durable, resilient material.

A fastening element 44 which may be a clip, clamp, ring or other fastening element, is slidably secured to inner ring 22 and outer ring 24 allowing for adjustments of inner ring 22 and outer ring 24 in relation to each other and thereby changing the size of the cutting area of Cool 10. By moving ring 22 in relation to outer ring 24 a smaller or larger inner cutting area is provided. When a continuous band is used instead of two separate rings, out ring 24 may be expanded by simply moving fastener 44 along outer ring 24 and inner ring 22 and then fastening second end portion 16 of handle 12 in aperture 32 and locking the two rings in position.

Outer ring 24 is preferably configured with a broadened curved shaped portion 46, as seen in FIGS. 1, 2, 3, and 5 for efficient cutting and scooping of the avocado meat from the skin. Broadened portion 46 is preferably shaped to scoop and remove the avocado from its skin and may be provided with a sharpened edge or otherwise. It is also seen in FIGS. 1–5 that cutting blades 34 are preferably positioned in a staggered relationship to one another on inner wall 40 of inner ring 22 and inner wall 42 of outer ring 24. Alternatively, cutting blades may be aligned and positioned in different ways, for example in a linear, or axially disposed arrangement, or any other spaced relation depending upon the size of the slice of avocado that is desired.

In reference now to FIG. 2, tool 10 is shown in a preferred double ring embodiment with inner ring 22 and outer ring 24 fastened and positioned together by means of fastener 44 and handle end 16 inserted through slot 28 and aperture 32 in set element 30. In FIG. 2, inner ring 22 and outer ring 24 are shown held together with blades 34 disposed in a slicing configuration. Tool 10 as shown, may be easily and conveniently used cutting from either a right hand side or a left hand side of the avocado.

Referring now to FIG. 3, tool 10 is shown in a double ring configuration with five blades 34 all of the same length. Inner ring 22 is shown fastened to outer ring 24 by fastener 44 and second end 16 of handle 12 being positioned in aperture 32 of set element 30. In this embodiment, five cutting blades are used. Using the embodiment shown larger slices will result than when the tool of FIGS. 1 and 2 are used, for example.

In FIG. 4, a ring configuration using a single continuous band to form outer ring 24 and inner ring 22 is shown. The single continuous band allows for the adjustments of size of inner ring 22 and outer ring 24 both in relation to one another and in absolute terms. Of course, as previously described, separate rings may also be used to form inner ring 22 and outer ring 24, however, it is very convenient and effective to use a single continuous band to from inner ring 22 and outer ring 24.

Referring now to FIG. 5, an alternative embodiment of tool 10 is shown where one ring 24 is used to form a single ring tool. In this embodiment ring 24 is looped about itself and fastened with fastener 44 and secured in position by second end 16 of handle 12 by placing end 16 through aperture 32 in set element 30 and fastening with screw 48. In the embodiment shown, eleven cutting blades 34 are used, however, alternatively, five cutting blades, or more, or less, may be used depending upon the application.

In operation and use tool 10 is very convenient, easy, reliable, and effective at cutting, scooping, peeling, and de-pitting an avocado. Tool 10 is held in either the right or left hand and an avocado held in the other hand or placed on a support surface. The avocado is then sliced in half and tool 10 is used to remove the avocado skin, remove the pit, and slice the avocado meat into slices. Tool 10 may be adjusted by changing the position of fastener 10 and set element 30 thereby altering both the relative and absolute size of inner ring 22 and outer ring 24. Different sizes and numbers of cutting blades 34 may be provided depending upon the size of avocado to be sliced and the size of slice desired.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A tool for use on an avocado, for separating the meat of an avocado from its skin while simultaneously cutting the meat into separate slices, comprising:

a handle having a first end and a second end;

cutting means mounted at one end of the handle; the cutting means including a pair of ring elements operably secured to the handle and extending away therefrom; the pair of ring elements comprising an inner ring and outer ring formed from a continuous band; the inner ring having an elongated guide slot operably positioned therein, and the outer ring having and elongated guide slot operably positioned therein and in operably alignment with the elongated guide slot of the inner ring and extending therethrough; the inner ring including a set element having a centrally positioned aperture therethrough adapted for releasably securing and receiving the second end of the handle;

a plurality of cutting blades operably positioned on an inner wall of the inner ring and a plurality of cutting blades operably positioned on an inner wall of the outer ring; and a fastening element slidably secured to the inner ring and the outer ring allowing for adjustments of the outer ring and the inner ring in relation to each other and to the second end of the handle.

2. The tool of claim 1, wherein said outer ring includes a broadened curved shaped portion extending from the outer ring adapted to cut and peel an avocado.

3. The tool of claim 1, wherein said plurality of cutting blades are spaced in a staggered pattern on said inner surface of said inner ring.

4. The tool of claim 1, wherein said plurality of cutting blades are spaced in a staggered pattern on said inner surface of said outer ring.

5. The tool of claim 1, wherein said plurality of cutting blades are comprises of blades of different length from one another.

6. The tool of claim 1, wherein the fastening element comprises a clip shaped fastening member.

7. An avocado peeling and slicing device, for separating the meat of an avocado from its skin while simultaneously cutting the meat into separate slices, comprising:

a handle having a first end and a second end;

a ring element operably secured to the handle and extending away therefrom; said ring element includes and an extension element integral therewith; the ring element having an elongated guide slot operably positioned therein, said extension element having an elongated guide slot operably positioned therein and in operably alignment with the elongated guide slot of the ring element; the ring element including a set element having a centrally positioned aperture therethrough adapted for releasably securing and receiving said second end of the handle therein;

a plurality of cutting blades operably positioned on an inner wall of the ring element; and fastening element means for fastening said ring element and said extension element together and being slidably secured to the ring element and to the extension element allowing for adjustment and positioning of the ring element and the extension element in relation to each other and to the second end of the handle.

8. The avocado peeling and slicing device of claim 7, wherein said ring element includes a broadened curved shaped portion extending from the ring element and adapted to cut and peel an avocado.

9. The avocado peeling and slicing device of claim 7, wherein said plurality of cutting blades are spaced in a staggered pattern on said inner surface of said ring element.

10. The avocado peeling and slicing device of claim 7, wherein said plurality of cutting blades comprise blades of different length from one another.

11. The avocado peeling and slicing device of claim 7, wherein said fastening element means comprise a clip shaped fastening member.

* * * * *